United States Patent Office 3,400,946
Patented Sept. 10, 1968

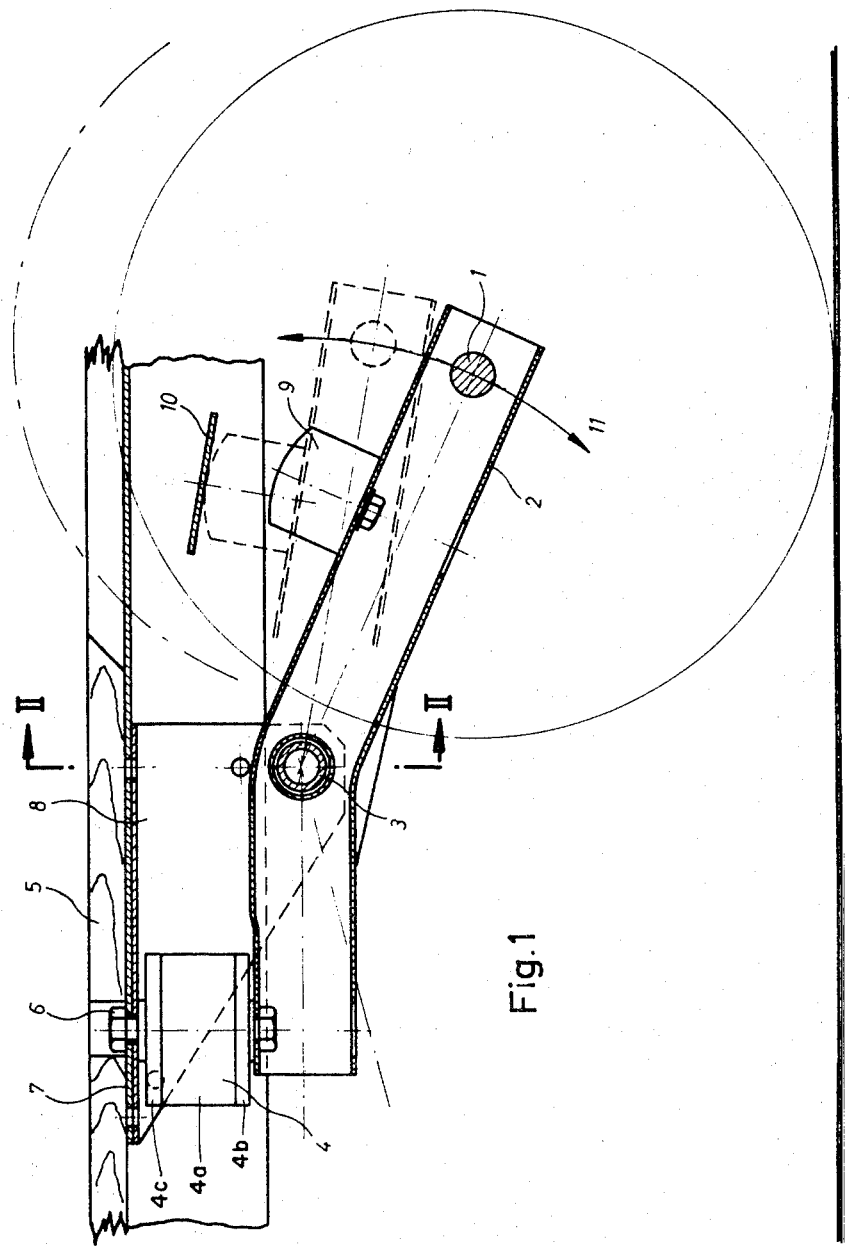

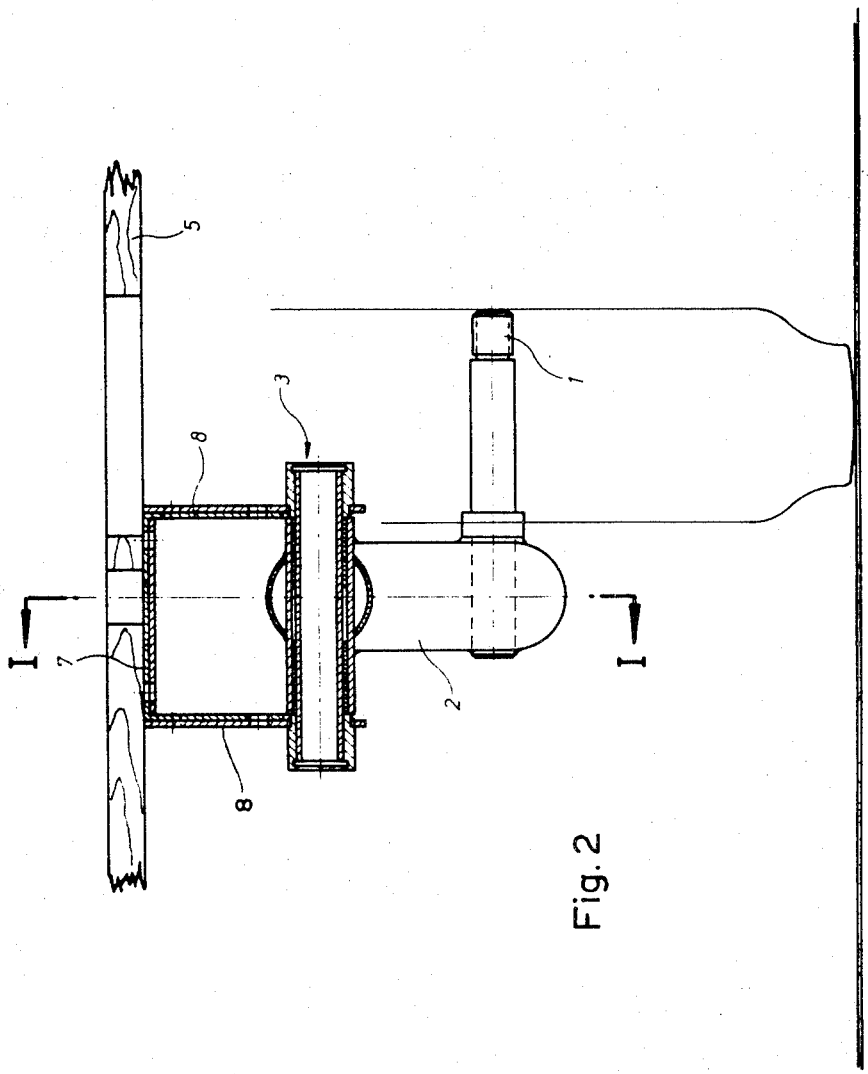

3,400,946
SPRING UNIT FOR SPRING SUSPENSION OF AXLES FOR TRANSPORTATION VEHICLES
Ludwig Bacher, 3496 Rankin Ave., Windsor, Ontario, Canada
Filed Feb. 10, 1966, Ser. No. 526,522
Claims priority, application Germany, Feb. 13, 1965, B 80,523
5 Claims. (Cl. 280—124)

ABSTRACT OF THE DISCLOSURE

The vehicle suspension assembly comprises a lever pivoted intermediate its ends on an axle, having a ground engaging wheel on one end of the lever and a spring unit connected to the other end of the lever and also connected to the frame of the vehicle. The spring unit comprises a rubber body acting in compression, and top and bottom plates permanently secured as by vulcanization to the top and bottom surfaces of the rubber body.

---

The invention applies in particular to the spring unit suspension of half-axles for transportation vehicles with a rubber spring as the spring element.

The spring suspension of a transportation vehicle is meant to convert hard knocks of the road into soft, compressed swings, so that only small forces and relevant vibrations would affect the body structure of the vehicle. In known constructions, generally used as spring elements are steel springs, i.e. leaf springs, coil springs and/or torsion bars. Known spring units of metal construction lack proper shock-absorption. Spring units with leaf springs as spring elements do contain a certain amount of self-compressed swings. However, these are not sufficient without appropriate additional shock absorbers. Spring units with metal springs as spring elements are comparatively expensive in maintenance and replacement. With transportation vehicles without propellants of their own, these expenses are especially noticeable. Axles of such vehicles are not as strongly built as axles of vehicles with their own drive units (motor) and are not used as steering and drive axles, but with free running wheels. They do not, therefore, require to be of such sturdy construction as the aforesaid axles, and usually do not require to have any such well constructed axle mountings. Axles with free running wheels should, therefore, be fitted with inexpensive and easily replaceable spring units, i.e. rubber spring units.

It is well known that rubber cushions are used between metal parts for the purpose of more elastic absorption of shocks and softening of vibrations. In all instances all these forces are absorbed by rubber under compression. It is well known that rubber springs are in use as compression springs for wheel suspension. In this way, however, the forces are very detrimental to the rubber, so that in time it is subject to deformation. The qualities of rubber under compression will in time diminish, and the safety of such spring units does not meet requirements. To forestall this so-called "spreading" or "crawling" of the rubber springs, metal springs are used simultaneously to ease the pressure of said rubber. Although the use of such rubber-metal spring combination gives a reasonably good spring effect and good shock-absorption, the expenses are nevertheless considerably higher.

The aim of this invention is to create a spring unit with a rubber spring as the spring element, of which the spring oscillating curve-line and shock-absorption qualities would make it especially suitable as a spring suspension for vehicle axles, simple and inexpensive to produce and mount and also to keep the springless mass at low point light.

With a spring unit as designed, especially with spring suspension for vehicles (half-axles) axles with a rubber spring for the spring element, the aim of the invention is solved by fixed mounting (at end of vehicle axle) at one arm of swing lever through bearing at vehicle chassis, whereas the other end of arm is united through the rubber spring with the vehicle chassis.

Through invention of in that way developed unit, the use of metal springs of which the spring oscillating curve-line would have to be progressively sustained through other means and would require simultaneous shock-absorption, are completely avoided. The only spring element here exclusively used to advantage is a rubber spring of known great shock-absorption qualities. The so-called "spreading" or "crawling" of rubber springs, used in accordance with the invention cannot take place, for when the vehicle is stationary the rubber springs are but slightly under strain of pull or tension, which however also takes place when vehicle is in operation, for through easing of stress and strain of pressures on suspended wheel the spring is also subjected to pressures.

For this invented spring unit to be most effective, the lever, bearing (pivot) and the chassis side of rubber spring mounting—as a sub-assembly—are mounted on a mutual carrier to provide an assembly which is to be mounted on the chassis of vehicle. Such a spring unit can be applied to advantage with vehicles of any width of track.

The invented spring unit does not have the shortcomings of spring characteristics supported by other means and is very simplified and cheap to produce. Besides the vehicle axles, carrying lever and rubber springs, there are no other moving parts. Further, the use of self-contained spring units allows for simplified carrying of stock. Such units, right and left-hand side, are mountable with any width of track. Naturally, it would be possible to mount said unit with axles, for instance, with each separately driven by electro-motor or where two half-axles as in some cases are required to be joined into one axle.

The vehicle carrying lever can be mounted crosswise or lengthwise to axle, but is preferably lengthwise. It is advisable to make the lever under an angle which at point of rotation will form a divergent angle between chassis and axle arm of lever. Through the bending of lever at point of rotation, the chassis is not broken through. Further obtained is a positive transverse avoidance of suspended wheel—upwards to the rear, by which means optimum springiness is obtained.

To limit the maximum movements of lever, a rubber buffer should be mounted on same between lever-bearing and axle facing in direction of chassis.

In the drawing the invention is schematically shown:

FIG. 1, longitudinal section along the line I—I of FIG. 2.

FIG. 2, cross-section along the line II—II of FIG. 1.

A wheel carrying half-axle 1 is mounted at end of one arm of a two arm (bent) lever 2, which at point of rotation is located in bearing 3. Bearing 3 is mounted in carrier 8. Carrier 8 consists of the two outside plates in FIG. 2. At the end of the other arm of lever 2 is mounted rubber spring unit 4. The rubber spring unit 4 has a body of rubber 4a and plates 4b and 4c permanently secured, as by vulcanization, to the top and bottom surfaces of the body of rubber 4a. The bottom plate 4b is bolted to one arm of the lever. The top plate is bolted to the angle frame 7 of the chassis by bolt 6. The rubber 4a acts in tension to support the chassis on the axle. On the one lever arm between axle 1 and point of oscillation point 3, a rubber buffer 9 is mounted pointing toward the chassis—which together with stop 10 on chassis limits spring movements of lever 2.

The carrier 8 consisting of the two parallel side plates can be secured, as by bolts to the angle frame 7 of the chassis. The carrier 8, lever 2, bearing 3 and spring unit 4 provide an assembly which can be conveniently mounted on and removed from the vehicle chassis.

In the shown arrangement, the lever extends longitudinally of the vehicle, and is bent so that the arm carrying the half-axle diverges downwardly at an angle from the surface of the chassis. This causes diagonally positive spring reflexes 11 and therefore optimum spring attributes. It is understood that lever 2 may be mounted crosswise of vehicle but in this case it would be advisable to bend the lever 2 at point of oscillation 3 at a lesser angle to obtain properly positioned line profile in relation to road.

In the drawing as shown is utilized only one rubber spring unit 4 for all kinds of loads. It is, however, within the framework of the invention to add additional so-called "fore-springs" to take up vibrations of loadless vehicles, which would be placed purposefully behind rubber spring unit 4 on lever arm 2 in the middle between rubber spring unit 4 and point of oscillation 3. In the drawing not shown, the "fore-spring" may be a similar "pull-action" rubber spring like unit 4 or it may be a steel spring. The rubber spring 4 takes up in this case the functions of a load spring of the loaded vehicle. It is also feasible that with very heavy loads several rubber springs, like unit 4, could be placed at even distances between point of oscillation 3 and the unit 4 shown.

What I claim as my invention is:

1. A vehicle suspension assembly comprising an elongated lever, means for mounting said lever on the frame of the vehicle intermediate the ends of said lever for oscillation about a generally horizontal axis, said lever having a first arm extending downwardly from said axis of oscillation at a substantial angle to the horizontal, a ground-engaging wheel mounted for rotation adjacent the end of said first arm, said lever having a second arm extending generally horizontally from said axis of oscillation, a spring unit comprising a resilient body of rubber or the like material, top and bottom plates permanently secured to the top and bottom surfaces of said body, means for securing said top plate to the vehicle frame, and means for securing said bottom plate to said second arm at a point spaced a substantial distance from said axis of oscillation, said body being placed in tension by the weight of the vehicle supported by said wheel.

2. The assembly defined in claim 1, wherein said plates are vulcanized to the top and bottom surfaces of said body.

3. The assembly defined in claim 1, wherein said means for mounting said lever on the frame of the vehicle includes an axle, a carrier for said axle, and means for removably mounting said carrier on the frame of the vehicle so that the entire suspension assembly, including said wheel, lever, spring unit, axle and carrier, can be readily mounted on and removed from the vehicle.

4. The assembly defined in claim 3, wherein said axle extends at right angles to the longitudinal center line of the vehicle, said first arm extends rearwardly and said second arm extends forwardly.

5. The assembly defined in claim 1, wherein a resilient buffer of rubber or like material is mounted on the upper surface of said first arm, and a stop is mounted on said frame in a position to be engaged by said buffer to limit the upward swing of said first arm.

References Cited

FOREIGN PATENTS 506,975 6/1939 Great Britain.
132,310 9/1919 Great Britain.

PHILIP GOODMAN, *Primary Examiner.*